United States Patent Office 3,812,180
Patented May 21, 1974

---

3,812,180
1-METHYL-SULFINYLBENZYLIDENE - 1,3,4,5-TETRAHYDRO - 5 - OXO-BENZ-(c,d)-INDENE-3-CARBOXYLIC ACID AND ESTERS
Tsung-Ying Shen, Westfield, and Howard Jones, Holmdel, N.J., assignors to Merck & Co., Inc., Rahway, N.J.
No Drawing. Filed July 21, 1972, Ser. No. 273,897
Int. Cl. C07c *145/00*
U.S. Cl. 260—515 A
2 Claims

ABSTRACT OF THE DISCLOSURE

New substituted benzylidene benzindenyl acids and derivatives thereof which have anti-inflammatory, antipyretic and analgesic activity. Also included herein are methods of preparing said benzylidene benzindenyl acids, pharmaceutical compositions having said benzylidene benzindenyl acids as an active ingredient and methods of treating inflammation by administering these particular compositions to patients.

SUMMARY OF THE INVENTION

Generally, this invention relates to new substituted benzylidene benzindenyl acid derivatives and processes for producing the same. This invention also relates to pharmaceutical compositions containing said indenyl acetic acid compounds as an active ingredient and to methods of treating pain, fever or inflammation by administering these particular compositions to patients.

DESCRIPTION AND PREFERRED EMBODIMENTS

This invention relates to new substituted benzylidene benzindenyl acids and processes for producing the same. More specifically, this invention relates to compounds having the following general formula:

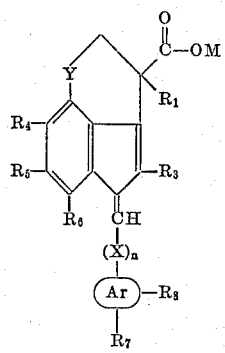

wherein:

$R_1$ may be hydrogen, halogen, alkyl, aryl, haloalkyl, alkylthio, arylthio, aralkylthio, amino, alkylamino, dialkylamino, acylamino, N-heterocyclic, hydroxy, alkoxy, alkenyloxy, alkynyloxy, aralkoxy, haloalkoxy, carboxy, alkoxycarbonyl or aralkoxycarbonyl;

$R_3$ may be hydrogen, alkyl, haloalkyl, alkenyl, alkynyl or trihalomethyl;

$R_4$, $R_5$, $R_6$, $R_7$ and $R_8$ each may be hydrogen, alkyl, acyloxy, aryloxy, alkoxy, nitro, amino, acylamino, alkylamino, dialkylamino, alkenyl, alkynyl, alkenyloxy, dialkylaminoalkyl, sulfamyl, alkylthio, alkylsulfinyl, alkylsulfonyl, hydroxy, hydroxyalkyl, acyl, halo, cyano, carboxyl, carboalkoxy, carbamido, haloalkyl, cycloalkyl, cycloalkyloxy, or aroyl;

X may be alkylene, alkenylene, alkynyl, alkynylene, O, S, carbonyl, sulfinyl, sulfonyl or NR where R can be hydrogen or alkyl;

Y may be alkylene, carbonyl or NR where R is hydrogen or alkyl;

Ar may be aryl or heteroaryl;

M may be hydrogen, alkyl, alkenyl, alkynyl, cycloalkyl, aryl, aralkyl, dimethylaminoethyl, α and β glucuronide, glyceryl, alkoxyalkyl, alkanoyloxyalkyl, aroyloxyalkyl, a metal cation or ammonium cation; and $n$ may be 0 or 1.

The aryl or heteroaryl substituent in the 1-position of the indene nucleus may include an aryl ring system such as benzene, naphthalene or biphenyl or a heteroaryl ring system such as a pyrrole, furan, thiophene, pyridine, imidazole, pyrazine, thiazole, etc. and may be substituted with any of the aforementioned $R_6$ and $R_7$ substituents.

In the most preferred compounds of this invention R and $R_1$ each may be hydrogen or loweralkyl, $R_3$ is loweralkyl, $R_4$, $R_5$, and $R_6$ each may be hydrogen, halogen, halogen, loweralkoxy, loweralkyl, nitro, amino or substituted amino such as dialkylamino, acylamino, alkylamino, etc., $R_7$ is alkylsulfinyl, $R_8$ is hydrogen, X is alkylene or alkylene, Y is alkylene, carbonyl or amino, $n$ is 0 or 1, M is hydrogen or loweralkyl, and Ar is phenyl. However, the substituents on the indene nucleus are not limited to the preferred class of substituents and includes all those set forth in formula I as well as those which are therapeutically equivalent to those which are specifically enumerated.

Representative compounds of this invention are as follows:

5-fluoro-2-methyl-1-p-methylsulfinylbenzylidene-1,3,4,5-tetrahydro-5-oxobenz-[c,d]-indenyl-3-carboxylic acid;

5-fluoro-2-methyl-1-p-methylsulfonylbenzylidene-1,3,4,5-tetrahydro-5-oxobenz-[c,d]-indenyl-3-carboxylic acid;

5-fluoro-2-methyl-1-p-methylthiobenzylidene-1,3,4,5-tetrahydro-5-oxobenz-[c,d]-indenyl-3-carboxylic acid;

7-fluoro-2-methyl-1-p-methylsulfinylbenzylidene-1,3,4,5-tetrahydro-5-oxobenz-[c,d]-indenyl-3-carboxylic acid;

5-cyano-2-methyl-1-p-methylsulfinylbenzylidene-1,3,4,5-tetrahydro-5-oxobenz-[c,d]-indenyl-3-carboxylic acid; and 5-chloro-2-methyl-1-p-methylsulfinylbenzylidene-1,3,4,5-tetrahydro-5-oxobenz-[c,d]-indenyl-3-carboxylic acid.

This invention also relates to a method of treating pain, fever or inflammation in patients using a compound of Formula I, particularly an especially preferred compound as the active constituent.

The compounds of the instant invention can be used to treat inflammation by reducing inflammation and relieving pain in such diseases as rheumatoid arthritis, osteoarthritis, gout, infectious arthritis and rheumatic fever. The compounds of Formula I also have anti-pyretic and analgesic activity and would be administered and used in the same manner and in the same dosage ranges as if they were being used to treat inflammation as discussed further on.

The treatment of inflammation in accordance with the method of the present invention is accomplished by topically, orally, rectally or parenterally administering to patients a composition of a compound of Formula I, particularly the especially preferred compounds in a non-toxic pharmaceutically acceptable carrier.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, Cab-o-Sil, and acacia. Exemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup, an aqueous solution or a liquid suspension. Suppositories may be prepared in a conventional manner by mixing the compounds of this invention with a suitable non-irritating excipient which is solid at room temperature, but liquid at the rectal temperature. Such materials are cocoa buter and polyethylene glycol. Gels and lotions for topical application may be prepared in conventional manners.

The active compounds of Formula I and of the compositions of this invention are administered in an amount sufficient to treat inflammation, that is to reduce inflammation. Advantageously, the compositions will contain the active ingredient, namely, the compounds of Formula I in an amount of from about 0.1 mg. to 50 mg. per kg. body weight per day (5 mg. to 3.5 g. per patient per day), preferably from about 1 mg. to 15 mg./kg. body weight per day (50 mg. to 1 g. per patient per day).

The method of treatment of this invention comprises administering to a patient (animal or human), a compound of Formula I, particularly an especially preferred compound admixed with a non-toxic pharmaceutical carrier such as exemplified above. The compounds of Formula I and particularly the especially preferred compounds will be administered in an amount of from 0.1 mg. to 50 mg./kg. body weight per day, preferably from about 1 mg. to about 15 mg. per kilogram body weight per day. The most rapid and effective anti-inflammatory effect is obtained from oral administration of a daily dosage of from about 1 to 15 mg./kg./day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of administration, route of administration, rate of excretion, drug combination, reaction sensitivities and severity of the particular disease.

The compounds of this invention are prepared by reacting the appropriate indanone with an alkyl α-bromosuccinate to form the corresponding indenyl-3-succinic acid. The desired 1-substituent is then introduced and this compound is cyclized to produce the corresponding tricyclic acid.

EXAMPLE 1

A. 5-fluoro-2-methylindenyl-3-succinic acid 6-fluoro-2-methylindanone (0.05 mole) activated zinc dust (0.07 mole) and methyl α-bromosuccinate (0.05 mole) are warmed in dry benzene (250 ml.) containing a crystal of iodine until self-sustaining reflux is promoted. The reaction is kept refluxing for 5 hours and poured into 5% sulfuric acid solution (250 ml.). The organic layer separates and is dried (MgSO$_4$). Removing the solvent leaves an oily hydroxy ester. The crude ester is redissolved in benzene (100 ml.) and refluxed and stirred with phosphorous pentoxide (20 g.) for 1 hour. The reaction mixture is filtered, the residue washed with benzene, and the combined organic layers are washed with water (2× 100 ml.). The organic solution is dried (MgSO$_4$), filtered and evaporated to dryness to give methyl 5-fluoro-2-methylindenyl-3-succinate as a yellow oil.

The above product is dissolved in ethanol (100 ml.) containing 2.5 N sodium hydroxide solution (70 ml.) and stirred at room temperature overnight. The ethanol is evaporated off under vacuo and the aqueous solution extracted with ether (2× 50 ml.), separated and acidified at 0° with concentrated HCl solution.

The solid 5-fluoro-2-methylindenyl-3-succinic acid is filtered off and dried.

B. 5-fluoro-2-methyl-1-p-methylsulfinylbenzylidene-indenyl-3-succinic acid 5-fluoro-2-methylindenyl-3-succinic acid (0.5 mole) is dissolved in pyridine (500 ml.) and to this is added p-methylsulfinylbenzaldehyde (0.5 mole) and Triton B (N-benzyl trimethyl ammonium hydroxide 40% in methanol) (200 ml., 0.5 mole). The dark green solution is stirred at room temperature overnight, evaporated to half volume under vacuum and poured into water (1 liter). The gummy solid is stirred for 2 hours when it becomes quite solid. The product is filtered off and dried.

C. 5-fluoro-2-methyl-1-p-methylsulfinylbenzylidene-1,3,4,5-tetrahydro-5-oxobenz-[c,d]-indenyl-3-carboxylic acid A mixture of 5-fluoro-2-methyl-1 - p - methylsulfinyl-benzylidene-3-succinic acid (0.1 mole) isopropenyl acetate (200 ml.) and p-toluene sulfuric acid monohydrate (2 gm.) is heated under reflux for ½ hour. The acetone is removed by fractionation slowly through a Vigreux column until the boiling point reaches 95°. The solution is then evaporated in vacuo and the residue crystallized.

The crude anhydride prepared as above (0.01 mole) is dissolved in warm ethylene dichloride (60 ml.). To this stirred suspension is added aluminium chloride (0.05 mole). The mixture is heated on a steam-bath for 1 hr., cooled in ice and a solution of 2.5 N hydrochloric acid (50 ml.) added. The precipitate is filtered, washed with water and redissolved in acetone. The product crystallizes out on cooling to give 5-fluoro-2-methyl-1-p-methylsulfinylbenzylidene - 1,3,4,5 - tetrahydro - 5 - oxobenz-[c,d]-indene-3-carboxylic acid.

EXAMPLE 2

5 - fluoro - 2 - methyl-1-p-methylthiobenzylidene-1,3,4,5-tetrahydro - 5 - oxobenz - [c,d] - indene - 3 - carboxylic acid The reactions of Example 1 are repeated, however, in part, 3 p-methylthiobenzaldehyde is used instead of p-methylsulfinylbenzaldhyde.

EXAMPLE 3

7 - fluoro- 2 - methyl - 1 - p - methylsulfinylbenzylidene-1,3,4,5-tetrahydro - 5 - oxobenz-[c,d]-indene-3-carboxylic acid

A. α-Methylhydrocinnamic acid:
A mixture of α-methylcinnamic acid (100 g.), ethyl acetate (400 ml.) and 5% Pd/C (5 g.) is hydrogenated at 60 p.s.i. of hydrogen at room temperature for ½ hour. The catalyst is filtered off and the α-methylhydrocinnamic acid obtained by evaporation under vacuum.

B. 2-methylindanone:
A mixture of α-methylhydrocinnamic acid (0.031 m.) in polyphosphoric acid (65 g.) is stirred and heated on the steam bath for 2 hours, poured into ice-water (300 ml.) and extracted into methylene chloride (3× 100 ml.). The organic layer is washed with saturated sodium bicarbonate solution (2× 50 ml.) water (1× 50 ml.) separated and dried over anhydrous magnesium sulfate. Filtering the solution followed by evaporation gives 2-methylindanone. Boiling point 82–95° at 1.2 to 2.0 mm. of Hg pressure.

C. 4-nitro-2-methylindanone:
The above product (47.0 g.) is nitrated at 0° with stirring by slowly adding a solution of potassium nitrate (35.3 g.) in concentrated sulfuric acid (80 ml.) to it in concentrated sulfuric acid (290 ml.) over 3 hours. The reaction mixture is poured into ice-water (5 l.) and extracted into ether (4× 750 ml.) the ether layer is washed with water (2× 500 ml.), sodium bicarbonate solution (2× 500 ml.), water again (2× 300 ml.) separated and dried over anhydrous magnesium sulfate. The residue after filtering and evaporating off the solvent under vacuum is chromatographed on silica-gel. (Baker analyzed 60–200 mesh, 3 ft. by 2 in.) using mixtures of petroleum-benzin and ether as eluant. The crystalline nitrated indanone isomers are collected.

D. 4 - amino - 2 - methylindanone: 4-nitro-2-methylindanone (31.5 g.) prepared above, in ethanol (200 ml.) is hydrogenated at 40 p.s.i. and room temperature over 0.2 g. platinum oxide. The catalyst is filtered off and the alcohol evaporated to one half its original volume, upon cooling the 4-amino-2-methyl indanone crystallized out.

E. 4 - fluoro-2-methylindanone: 4-amino-2-methylindanone (0.25 mole) is dissolved in fluoroboric acid (42%, 105 ml.) and water (105 ml.) cooled to 5° C. To this with stirring is added a solution of sodium nitrite (17.5 g.) in water (35 ml.) at 5° C. The solid salt is filtered off and washed successively with water, methanol and then ether. The dry solid is powdered and decomposed by gently heating in powdered glass with a Bunsen burner. The crude product is leached well with benzene and run through a short silica-gel column (6 in. x 1 in.). Evaporation of the solvent gives 4-fluoro-2-methylindanone.

Reactions 1 through 4 of Example 1 are then repeated to get the title compound.

EXAMPLE 4

5 - cyano - 2 - methyl - 1 - p - methylsulfinylbenzylidene-1,3,4,5 - tetrahydro - 5 - oxo-benz-[c,d]-indenyl-3-carboxylic acid Reactions 1 through 4 of Example 1 are repeated, using 6-cyano-2-methylindanone in place of 6-fluoro-2-methylindanone to get the title compound.

EXAMPLE 5

5 - fluoro - 2 - methyl - 1 - p - methylsulfinylbenzylidene-1,3,4,5-tetrahydro-[c,d]-idenyl-3-carboxylic acid The product from Example 1 above (0.1 mole) and hydrazine hydrate (0.5 mole 85% solution) is added to a cooled solution of sodium hydroxide (0.5 mole) in diethylene glycol (250 ml.). The mixture is heated under reflux for 20 minutes, cooled, diluted with water (500 ml.) and extracted with ether. The aqueous solution is cooled in an ice-bath, acidified with concentrated hydrochloric acid and extracted with ether. The ethereal extract is washed with water, dried (MgSO₄) and evaporated in vacuo. The product is a solid.

EXAMPLE 6

5 - cyano - 2 - methyl - 1 - p - methylsulfinylbenzylidene-1,3,4,5-tetrahydro-benz-[c,d]-indenyl-3-carboxylic acid The above reaction of Example 5 is repeated on 5 - cyano - 2 - methyl - 1 - p - methylsulfinylbenzylidene-1,3,4,5 - tetrahydro - 5 - oxobenz-[c,d]-indenyl-3-carboxylic acid to get the title compound.

EXAMPLE 7

Sodium 5 - fluoro - 2 - methyl-1-(p-methylsulfinylbenzylidene)-1,3,4,5-tetrahydro - 5 - oxobenz-[c,d]-indenyl-3-acetate Sodium methoxide (25% solution in water) (7.4 ml.) is added to a stirred solution of the acid (12.0 g.) (.033 m.) in tetrahydrofuran (200 ml.). The precipitate is filtered off and dried at 60° under vacuum.

EXAMPLE 8

Ammonium 5-fluoro - 2 - methyl - 1 - (p - methylsulfinylbenzylidene) - 1,3,4,5 - tetrahydro - 5 - oxobenz-[c,d]-indenyl-3-acetate Ammonium hydroxide (concentrated) is reacted as in Example 7 to give the analogous ammonium salt.

EXAMPLE 9

Esters of 5 - fluoro - 2 - methyl-1-(p-methylsulfinylbenzylidene) - 1,3,4,5 - tetrahydro-5-oxobenz-[c,d]-idenyl-3-acetate (A) Simple esters—A mixture of .1 mole of 5-fluoro-2-methyl - 1 - (p - methylsulfinylbenzylidene)-1,3,4,5-tetrahydro-5-oxobenz-[c,d]-indenyl-3-acetic acid, .2 g. of p-toluene sulfonic acid, 100 ml. of absolute ethanol and 75 ml. of dry benzene is refluxed on a steam bath while slowly distilling the solvent. After 17 hours the residual solvent is removed under reduced pressure. The residue is slurried in aqueous sodium bicarbonate and then with water until neutral. The resulting ethyl ester may be recrystallized from organic solvents such as ethyl acetate, benzene and the like. When methanol, propanol, t-butanol and benzyl alcohol are used instead of the ethanol in the above procedure, there is obtained the corresponding methyl, propyl, t-butyl and benzyl esters.

(B) Alkoxyalkyl esters.—Chloromethyl methyl ether (0.055 mole) is added to a suspension of 5-fluoro-2-methyl-1-(p - methylsulfinylbenzylidene)-1,3,4,5-tetrahydro-5-oxobenz-[c,d]-indenyl-3-acetic acid (0.05 mole) and anhydrous potassium carbonate (0.15 mole) in 250 ml. of anhydrous acetone. The mixture is allowed to stir overnight at room temperature. Diethyl ether is added (about 200 ml.) and the mixture is filtered. The filtrate is washed once with 100 ml. of water and dried over anhydrous sodium sulfate. It is then filtered and the solvent is removed in vacuo. The residue is chromatographed on 200 g. of acid-washed alumina, using ether-petroleum ether (varying from 10 to 60% ether by volume) as the eluant to give methoxymethyl 5-fluoro-2-methyl-1-(p - methylsulfinylbenzylidene)-1,3,4,5-tetrahydro-5-oxobenz-[c,d]-indenyl-3-acetate.

(C) Phenyl 5-fluoro-2-methyl-1-(p-methylsulfinylbenzylidene)-1,3,4,5-tetrahydro-5-oxobenz - [c,d] - indenyl-3-acetate.—A solution of 0.0054 mole of N,N'-dicyclohexylcarbodiimide in 6 ml. of anhydrous tetrahydrofuran is added to a solution of 5-fluoro-2-methyl-1-(p-methylsulfinylbenzylidene)-1,3,4,5-tetrahydro-5-oxobenz - [c,d]-indenyl-3-acetic acid (0.005 mole) and phenol (0.0054 mole) in 17 ml. of anhydrous tetrahydrofuran. The mixture is shaken vigorously and allowed to sit, stoppered, at room temperature overnight.

After filtering off the N,N'-dicyclohexylurea, 2 ml. of glacial acetic acid is added to the filtrate and the mixture allowed to stand one hour. After filtering, 200 ml. ether is added to the filtrate and the ether solution washed with 2× 100 ml. saturated sodium bicarbonate solution and 3× 100 ml. water and then dried over anhydrous sodium sulfate. The mixture is filtered, concentrated in vacuo to 25 ml. and chromatographed on a 150 g. acid washed alumina column using ether-petroleum ether (v./v. 10–60%) as eluant to give phenyl 5-fluoro-2-methyl-1-(p-methylsulfinylbenzylidene) - 1,3,4,5 - tetrahydro-5-oxobenz-[c,d]-indenyl-3-acetate.

Similarly, using 2-(2-methoxyethoxy)-ethanol, glycol or N-acetyl-ethanolamine in place of phenyl in the above procedure gives 2-(2-methoxyethoxy)-ethyl 5-fluoro-2-methyl-1-(p-methylsulfinylbenzylidene)-1,3,4,5-tetrahydro-5-oxobenz-[c,d]-indenyl-3-acetate, β-hydroxyethyl 5-fluoro-2-methyl-1-(p-methylsulfinylbenzylidene)-1,3,4,5-tetrahydro-5-oxobenz-[c,d]-3-acetate and β-acetamidoethyl-5-fluoro-2-methyl-1-(p-methylsulfinylbenzylidene)-1,3,4,5-tetrahydro-5-oxobenz-[c,d]-indenyl-3-acetate, respectively.

A mixture of .06 mole of sodium 5-fluoro-2-methyl-1-(p-methylsulfinylbenzylidene) - 1,3,4,5 - tetrahydro-5-oxobenz-[c,d]-indenyl-3-acetate and 0.05 mole of trityl bromide in 100 ml. anhydrous benzene is refluxed with rapid stirring under nitrogen for 5 hours. The hot reaction mixture is filtered and the filtrate is concentrated *in vacuo*. The residual oil is recrystallized from methyl ethyl ketone to give trityl 5-fluoro-2-methyl-1-(p-methylsulfinylbenzylidene) - 1,3,4,5 - tetrahydro-5-oxobenz-[c,d]-indenyl-3-acetate.

Similarly when the phenyl or trityl ester of 5-fluoro-2-methyl-1-(p - methylsulfinylbenzylidene)-1,3,4,5-tetrahydro-5-oxobenz-[c,d]-indenyl-3-acetic acid or any of the other indenyl acids described in other examples are used in place of the above-described acid in any of the above preparations, the corresponding esters are obtained.

EXAMPLE 10

5 - fluoro - 2 - methyl - 1 - (p-methylsulfinylbenzylidene)-1,3,4,5 - tetrahydro - 5 - oxobenz - [c,d] - indenyl - 5-acetic-β-D-glucopyranosiduronic acid The sodium salt of the indenyl acid is made as in Example 7 above.

Methyl (tri-O-acetyl-α-D-glucopyranosylbromide)- is made according to a procedure described in J. Amer. Chem. Soc. 77, 3310 (1955) or J. Amer. Chem. Soc., 82, 2827 (1960).

The dry sodium salt (0.1 m.) and the bromopyranoside (0.12 m.) are heated in dry dimethyl sulfoxide with stirring at 60° for 2 hours. The crude product was used as isolated as the impurity in it, namely, the free acid, is a biproduct of the next reaction.

The crude product (13 g.) in dimethoxyethane (125 ml.) and 2.5 N hydrochloric acid (62.5 ml.) is heated to 90° for 3 hours. The solution is evaporated at 70° to one half volume and extracted with methylene dichloride (2× 30 ml.). The solution is then saturated with sodium chloride and extracted with methylene chloride again (30 ml.). The solution is extracted with ethylacetate (2× 50 ml.), and the organic layer dried (anhydrous magnesium sulfate) filtered and evaporated to dryness. In this way the glucuronic acid derivative can be isolated from the starting material.

EXAMPLE 11

Pivalloyloxymethyl - 5 - fluoro - 2 - methyl-1-(p-methylsulfinylcinnamylidene) - 1,3,4,5 - tetrahydro-5-oxobenz-[c,d]-indenyl-3-acetate Triethylamine (1.2 g.) in dimethylformamide (10 ml.) was added over 5 minutes to a stirred solution of the indene acid (0.01 mole) in dimethylformamide (100 ml.) at room temperature. After 10 minutes pivalloyloxymethylchloride (1.9 g.) is added in dimethylformamide (10 ml.). The stirred solution is kept at 90° for 18 hours, poured into water (300 ml.) and extracted with ether (2× 300 ml.). The ether extract was washed with sodium hydroxide solution (2.5 N, 50 ml.), water (50 ml.) separated and dried (anhydrous magnesium sulfate). The product isolated by evaporation, was purified by column chromatography on silica-gel (Baker 80–100 mesh) in a 2 ft. x 1 in. column, eluting with methylene chloride.

The product isolated in this was recrystallized from benzene-n-hexane.

EXAMPLE 12

N - [5 - fluoro - 2 - methyl - 1 - (p-methylsulfinylbenzylidene) - 1,3,4,5 - tetrahydro - 5 - oxobenz-[c,d]-indenyl-3-acetyl]-glycine (A) Benzyl - N - [5 - fluoro-2-methyl-1-(p-methylsulfinylbenzylidene) - 1,3,4,5 - tetrahydro-5-oxobenz-[c,d]-indenyl-3-acetyl]-glycinate.—The procedure of Example 10 is followed using benzylamino acetate in place of the morpholine to produce the above-named compound.

(B) N - [5 - fluoro - 2 - methyl - 1 - (p - methylsulfinylbenzylidene) - 1,3,4,5 - tetrahydro - 5 - oxobenz - [c,d]-indenyl - 3 - acetyl] - glycine.—Benzyl - N - [5 - fluoro-2-methyl - 1 - (p - methylsulfinylbenzylidene) - 1,3,4,5 - tetrahydro - 5 - oxobenz - [c,d] - indenyl - 3 - acetyl] - glycinate (0.003 mole) in a mixture of 25 ml. of anhydrous ethanol and 2.5 ml. of 1 N sodium hydroxide is allowed to stand at room temperature for 18 hours. The solution is diluted with water and extracted with ether. The aqueous layer is acidified with dilute hydrochloric acid and the organic product is extracted with ethyl acetate, washed with water and dried over sodium sulfate. Evaporation of the solution gives N-[5-fluoro-2-methyl-1-(p-methylsulfinylbenzylidene) - 1,3,4,5 - tetrahydro - 5 - oxobenz - [c,d]-indenyl-3-acetyl]-glycine.

When any of the other 1-aralkylidene indenyl aliphatic acids described in the other examples of these specifications are used in the above procedure in place of the 5-fluoro - 2 - methyl - 1 - (p - methylsulfinylbenzylidene)-1,3,4,5 - tetrahydro - 5 - oxobenz - [c,d] - indenyl - 3-acetic acid, the corresponding indenyl acyl glycine is obtained.

EXAMPLE 13

5 - fluoro - 2 - methyl - 1 - (methylsulfinylbenzylidene)-1,3,4,5 - tetrahydro - 5 - oxobenz - [c,d] - indenyl - 3-acetmorpholide A mixture of 5-fluoro-2-methyl-1-(p-methylsulfinylbenzylidene) - 1,3,4,5 - tetrahydro - 5 - oxobenz - [c,d]-indenyl-3-acetic acid (0.01 mole) and thionyl chloride (0.03 mole) in a dried flask, condenser and drying tube set-up is heated on the steam bath until evolution of gas ceases. Excess thionyl chloride is then removed *in vacuo*, the residue taken up in a slight excess of anhydrous ether and added slowly to a vigorously stirred, ice-cooled solution of dry morpholine (0.035 mole) in 100 ml. of ether. The mixture is stirred overnight at room temperature, filtered, the morpholine hydrochloride washed with excess ether, and the combined ether filtrates washed with 2× 100 ml. water dried over anhydrous sodium sulfate, filtered, and the ether removed *in vacuo*. Chromatography of the crude product on a silica-gel column, using v./v. 50–100% ether in petroleum ether as eluant gives the desired morpholide.

Similarly, when morpholine is replaced by an equivalent amount of the following amines, the corresponding amides are obtained.

Dimethylamine
Ethanolamine
Benzylamine
N,N-diethylethylenediamine
Benzylgalycinate
Piperidine
Pyrrolidine
N-methylpiperazine
N-phenylpiperazine
N-hydroxyethylpiperazine
Piperazine
Diethylamine
Diethanolamine
Aniline
p-Ethoxyaniline
p-Chloraniline
p-Fluoroaniline
p-Trifluoromethylaniline
Butylamine
Cyclohexylamine
Methylamine
D-glucosamine
Tetra-o-acetyl-d-glucosamine
D-galactosylamine
D-mannosylamine
N,N-dimethyl-glycine amide
N,N-dibutylglycine amide
β-Ethoxyethylamine
Di (β-ethonyethyl) amine
β-Phenethylamine
α-Phenethylamine
Dibenzylamine
D-mannosamine

EXAMPLE 14

A mixture of 250 parts of 5-fluoro-2-methyl-1-(p-methylsulfinylbenzylidene) - 1,3,4,5 - tetrahydro - 5 - oxobenz-[c,d]-indenyl-3-carboxylic acid and 25 parts of lactose is granulated with suitable water and to this is added 100 parts of maize starch. The mass is passed through a 16-mesh screen. The granules are dried at a temperature below 60° C. The dry granules are passed through a 16-mesh screen and mixed with 3.8 parts of magnesium stearate. They are then compressed into tablets suitable for oral administration according to the method of this invention.

What is claimed is:

1. A compound of the formula:

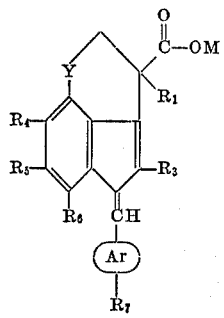

wherein:

$R_1$ is hydrogen or loweralkyl;
$R_3$ is loweralkyl;
$R_4$, $R_5$ and $R_6$ are each hydrogen, halogen, loweralkoxy, loweralkyl, nitro or amino;
$R_7$ is methylsulfinyl;
Y is carbonyl;
M is hydrogen or loweralkyl; and
Ar is phenyl.

2. The compound, 7-fluoro-2-methyl-1-p-methyl-sulfinylbenzylidene - 1,3,4,5 - tetrahydro - 5 - oxobenz - [c,d]-indene-3-carboxylic acid, according to claim 1.

References Cited

UNITED STATES PATENTS

| | | | |
|---|---|---|---|
| 3,312,730 | 4/1967 | Winter et al. | 260—473 |
| 3,622,623 | 11/1971 | Shen et al. | 260—515 |
| 3,654,349 | 4/1972 | Shen et al. | 260—515 M |
| 3,692,825 | 9/1972 | Conn | 260—515 A |
| 3,700,730 | 10/1972 | Hinkley | 260—515 A |
| 3,732,292 | 5/1973 | Hinkley et al. | 260—515 A |

JOHN D. RANDOLPH, Primary Examiner

G. THOMAS TODD, Assistant Examiner

U.S. Cl. X.R.

260—240 R, 465 D, 469, 470, 471 R, 473 F, 515 R, 515 P, 515 M, 516, 518 R, 518 A, 519, 520; 424—250, 258, 263, 270, 273, 274, 275, 285, 304, 308, 309, 317